United States Patent
Hayami et al.

(10) Patent No.: US 9,461,542 B2
(45) Date of Patent: Oct. 4, 2016

(54) POWER SUPPLY APPARATUS

(71) Applicant: FUJITSU LIMITED, Kawasaki-shi, Kanagawa (JP)

(72) Inventors: Kazunori Hayami, Fukuoka (JP); Yoshiyasu Nakashima, Kawasaki (JP); Yu Yonezawa, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 176 days.

(21) Appl. No.: 14/446,439

(22) Filed: Jul. 30, 2014

(65) Prior Publication Data

US 2015/0084607 A1  Mar. 26, 2015

(30) Foreign Application Priority Data

Sep. 20, 2013  (JP) ................. 2013-196001

(51) Int. Cl.
*H02M 3/158* (2006.01)
*H02M 1/00* (2006.01)

(52) U.S. Cl.
CPC ..... *H02M 3/158* (2013.01); *H02M 2001/0058* (2013.01); *Y02B 70/1491* (2013.01)

(58) Field of Classification Search
CPC ............. H02M 3/158; H02M 2001/0058
USPC ....................................... 323/271
See application file for complete search history.

(56) References Cited

U.S. PATENT DOCUMENTS

2009/0102294 A1* 4/2009 Hodges ............ H02H 3/12
307/126

FOREIGN PATENT DOCUMENTS

| JP | 1-248957 | 10/1989 |
| JP | 8-32165 | 3/1996 |
| JP | 9-201044 | 7/1997 |

* cited by examiner

*Primary Examiner* — Adolf Berhane
*Assistant Examiner* — Afework Demisse
(74) *Attorney, Agent, or Firm* — Fujitsu Patent Center

(57) ABSTRACT

A power supply apparatus includes a power supply section and a control section. The power supply section includes a first switch which performs switching of power-supply output, an inductor and a capacitor which form an LC circuit that resonates current flowing through the first switch, and a second switch which changes capacitance of the capacitor. The control section finds in advance a correspondence between a time ratio of a switching pulse of the first switch and a resonance frequency which matches an edge of a switching pulse having each time ratio, and controls switching of the second switch so as to resonate the LC circuit at a resonance frequency corresponding to a time ratio at operation time.

4 Claims, 18 Drawing Sheets

T1

| LOOP COMPENSATION SIGNAL VALUE | DRIVER OUTPUT VALUE |
|---|---|
| 0 | 0.08 |
| 0.01 | 0.08 |
| 0.02 | 0.08 |
| 0.03 | 0.08 |
| 0.04 | 0.08 |
| 0.05 | 0.08 |
| 0.06 | 0.08 |
| 0.07 | 0.08 |
| 0.071 | 0.13 |
| 0.072 | 0.18 |
| 0.073 | 0.23 |
| 0.074 | 0.28 |
| 0.075 | 0.33 |
| 0.076 | 0.38 |
| 0.077 | 0.43 |
| 0.078 | 0.48 |
| 0.079 | 0.53 |
| 0.08 | 0.58 |
| 0.081 | 0.63 |
| 0.082 | 0.68 |
| 0.083 | 0.73 |
| 0.084 | 0.78 |
| 0.085 | 0.83 |
| 0.086 | 0.88 |
| 0.087 | 0.93 |
| 0.088 | 0.98 |
| 0.089 | 0.99 |
| 0.09 | 0.99 |
| 0.1 | 0.99 |
| 0.11 | 0.99 |
| 0.12 | 0.99 |
| 0.13 | 0.99 |
| 0.14 | 0.99 |

FIG. 9

POWER SUPPLY APPARATUS

CROSS-REFERENCE TO RELATED APPLICATION

This application is based upon and claims the benefit of priority of the prior Japanese Patent Application No. 2013-196001, filed on Sep. 20, 2013, the entire contents of which are incorporated herein by reference.

FIELD

The embodiment discussed herein is related to a switching power supply apparatus.

BACKGROUND

As semiconductor processes become minuter, in recent years the absolute value of power-supply voltage has become smaller and the requirements of accuracy with which voltage is set have become severer. In addition, with an increase in integration level, there is a tendency for power-supply current to increase to several tens of amperes.

POL (Point Of Load) by which a power-supply circuit, such as a non-isolated step-down DC(Direct Current)-DC converter, is placed near a device that is the load on a power supply is effective for systems having the above uses. By adopting the power supply architecture of the POL, a loss caused by a drop in voltage is prevented or responsibility is improved.

In order to accommodate fluctuations in current consumed by LSI (Large Scale Integration), it is desirable with the POL to make a switching frequency of a switching power supply as high as possible. However, if a switching frequency is too high, great loss occurs in a switching element such as a FET (Field Effect Transistor).

A technique referred to as soft switching is known as a technology for preventing such loss at switching time and stabilizing output voltage. A resonant converter is widely known as typical soft switching.

For example, the following two techniques were proposed formerly as a resonant converter. One is to divide resonance capacitors and perform switching for changing a resonance frequency. By doing so, the resonance capacitors have plural values according to switching frequencies. The other is to change a resonance frequency by changing an inductance value.

Japanese Laid-open Patent Publication No. 01-248957
Japanese Laid-open Patent Publication No. 09-201044

When disturbance, such as fluctuations in load, occurs, control is exercised for stabilizing output voltage. If a resonance frequency is variably set at this time, circuit structure is complex with the above conventional resonant converters.

In order to stabilize output voltage, control is exercised for switching a resonance capacitor under the output condition or the input condition under which the value of a switching frequency is smaller than or equal to a limit value (see, for example, Japanese Laid-open Patent Publication No. 01-248957).

However, a switching frequency (switching timing) of a switching power supply is sequentially made to match switching timing of the resonance capacitor in an adaptive manner during operation. As a result, circuit structure in a control system is complex.

In addition, a transformer-type inductor is used and a secondary side of the transformer is switched (see, for example, Japanese Laid-open Patent Publication No. 09-201044). As a result, great loss occurs on the secondary side and a control circuit for preventing this loss is newly placed.

SUMMARY

According to an aspect, there is provided a power supply apparatus which includes a power supply section including a first switch which performs switching of power-supply output, an inductor and a capacitor which form an LC circuit that resonates current flowing through the first switch, and a second switch which changes capacitance of the capacitor and a control section which finds in advance a correspondence between a time ratio of a switching pulse of the first switch and a resonance frequency that matches an edge of a switching pulse having each time ratio and which controls switching of the second switch so as to resonate the LC circuit at a resonance frequency corresponding to a time ratio at operation time.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 indicates an example the structure of a table stored in a memory;

DESCRIPTION OF EMBODIMENTS

Figure 1:
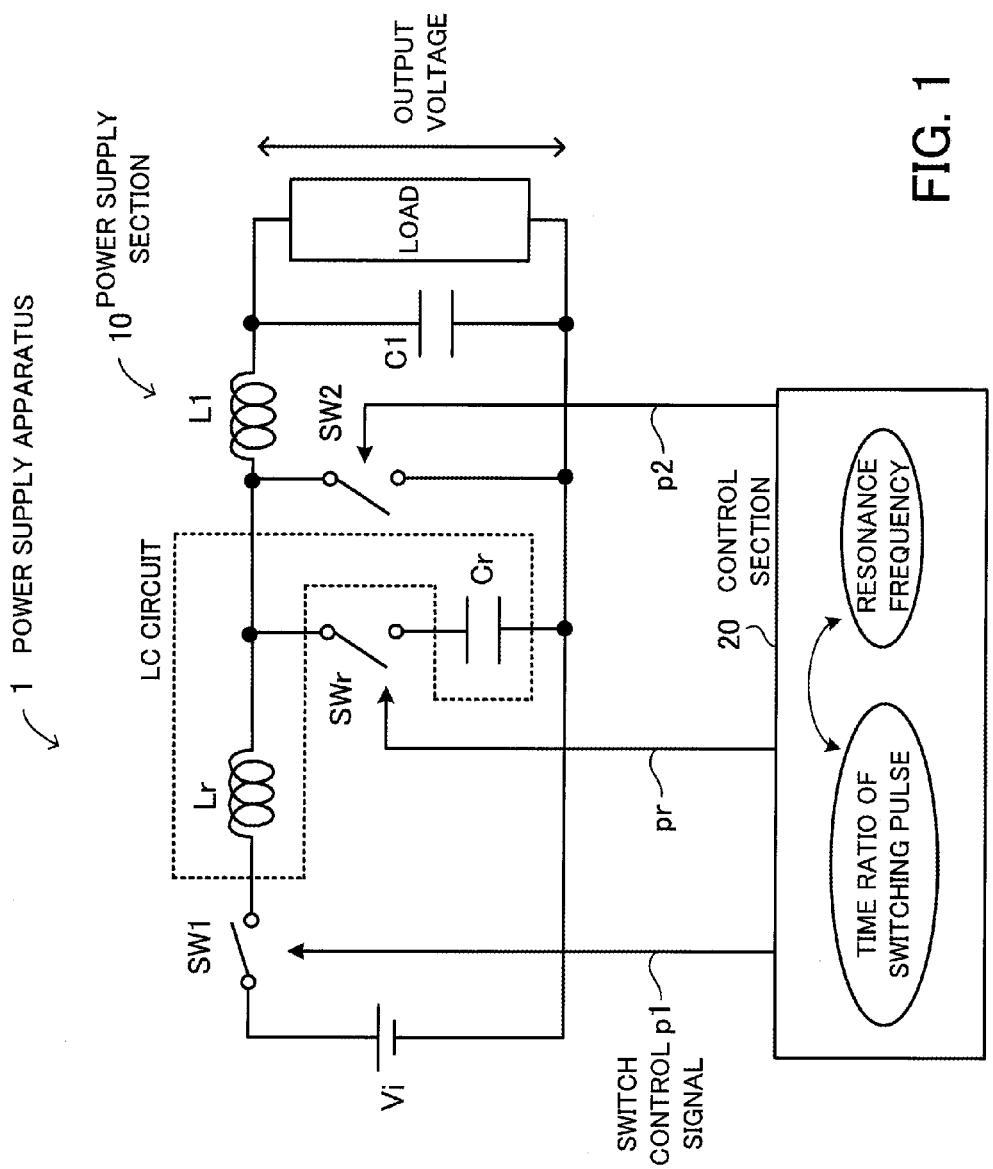
FIG. 1 illustrates an example of the structure of a power supply apparatus.

An embodiment will now be described with reference to the accompanying drawings, wherein like reference numerals refer to like elements throughout. FIG. 1 illustrates an example of the structure of a power supply apparatus. A power supply apparatus 1 is a switching power supply apparatus and includes a power supply section 10 and a control section 20.

The power supply section 10 includes a direct-current power supply Vi, a switch SW1 (first switch), a switch SWr (second switch), a switch SW2, inductors Lr and L1, and capacitors Cr and C1. The switch SW1 performs switching of output from the direct-current power supply Vi on the basis of a switch control signal p1.

The inductor Lr and the capacitor Cr form an LC circuit which resonates current flowing through the switch SW1. The switch SWr changes the capacitance of the capacitor Cr on the basis of a switch control signal pr.

The inductor L1 and the capacitor C1 form a filter which smooths direct-current signal output. Furthermore, the switch SW2 is used for supplying current to the inductor L1 on the basis of a switch control signal p2.

The control section 20 outputs the switch control signals p1 and pr to control switching of the switches SW1 and SWr respectively. In addition, the control section 20 finds in advance the correspondence between a time ratio (ratio of switch-on time to switch-off time) of a switching pulse of the switch SW1 and a resonance frequency which matches an edge of a switching pulse having each time ratio.

The control section 20 then exercises control for switching the switch SWr on the basis of the switch control signal pr so as to resonate the LC circuit at a resonance frequency which corresponds to a time ratio at operation time and which is found in advance.

As has been described, the power supply apparatus 1 finds in advance the correspondence between a time ratio of a switching pulse and a resonance frequency which matches an edge of a switching pulse having each time ratio. Furthermore, the power supply apparatus 1 recognizes a resonance frequency corresponding to a time ratio of a switching pulse at operation time from among resonance frequencies found in advance, and controls the power supply section 10 on the basis of the recognized resonance frequency.

As a result, the power supply apparatus 1 uses the resonance frequencies found in advance for exercising switching control so as to resonate the LC circuit. This makes it possible to stabilize output voltage by simple circuit structure.

The circuit structure and operation of and problems with an ordinary current resonance converter will now be described before the power supply apparatus 1 according to the embodiment is described in detail.

A current resonance converter is known as a type of resonant converter. With the current resonance converter an LC circuit formed of an inductor (L) and a capacitor (C) is used for resonating a current waveform and making it a sine wave. The current resonance converter makes a switching frequency match a resonance frequency, makes the waveform of current flowing through a switching element a resonance waveform, and turns on and off a switch at the time of the sine-wave current being zero. By doing so, switching loss is reduced.

Figure 2:
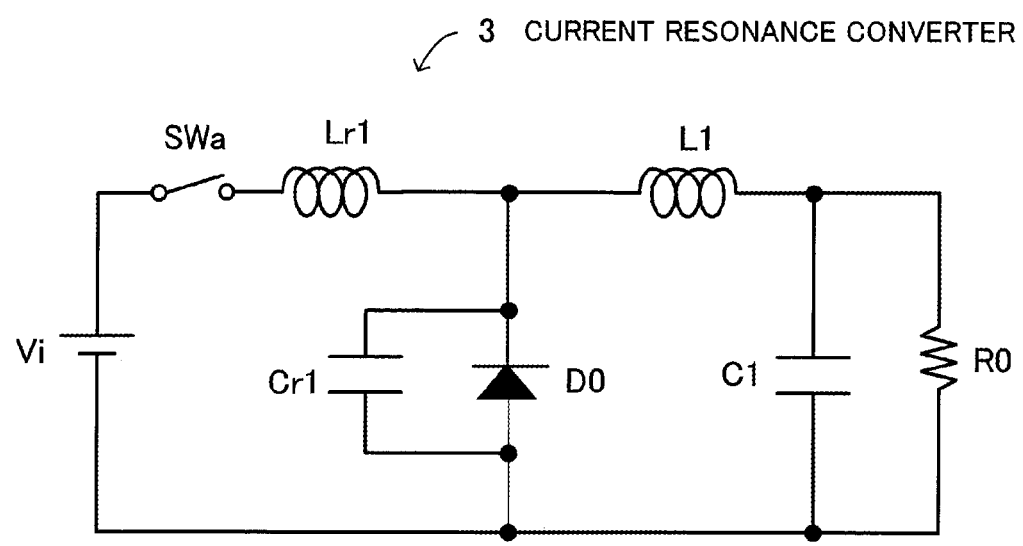
FIG. 2 illustrates an example of the structure of a current resonance converter.

FIG. 2 illustrates an example of the structure of a current resonance converter. FIG. 2 illustrates the (simplified) circuit structure of a step-down DC-DC converter. A current resonance converter 3 includes a direct-current power supply Vi, a switch SWa, inductors Lr1 and L1, capacitors Cr1 and C1, a diode D0, and a load resistor R0.

With the current resonance converter 3 an inductor and a capacitor are connected to a switching power supply (corresponding to a PWM (Pulse Width Modulation) converter). That is to say, the resonance inductor Lr1 is connected in series with the switch SWa included in a switching power supply.

Furthermore, the resonance capacitor Cr1 is connected in parallel with the diode D0 included in the switching power supply. The inductor L1 and the capacitor C1 form a filter for smoothing direct-current signal output.

Each component is connected in the following way. A (+) terminal of the direct-current power supply Vi is connected to one end of the switch SWa. The other end of the switch SWa is connected to one end of the inductor Lr1. The other end of the inductor Lr1 is connected to one end of the inductor L1, one end of the capacitor Cr1, and a cathode of the diode D0.

The other end of the inductor L1 is connected to one end of the capacitor C1 and one end of the load resistor R0. A (−) terminal of the direct-current power supply Vi is connected to the other end of the capacitor Cr1, an anode of the diode D0, the other end of the capacitor C1, and the other end of the load resistor R0.

Figure 3:
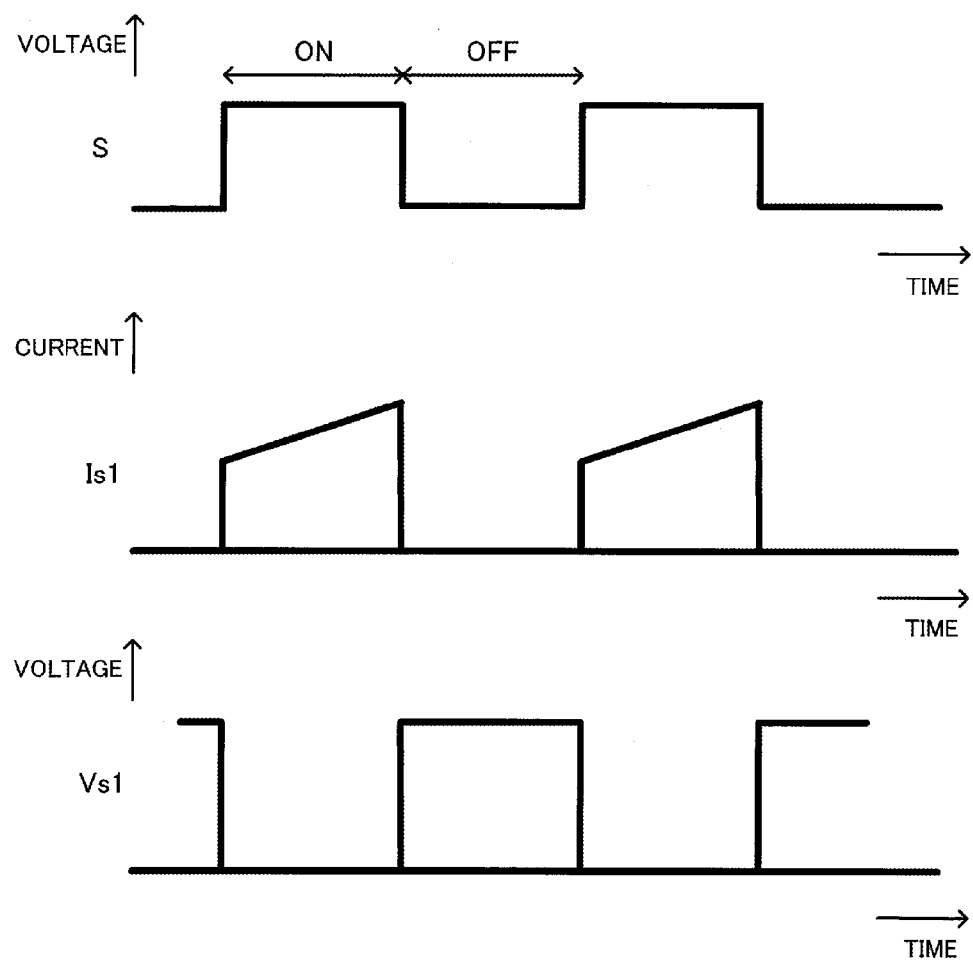
FIG. 3 indicates operational waveforms.
Figure 4:
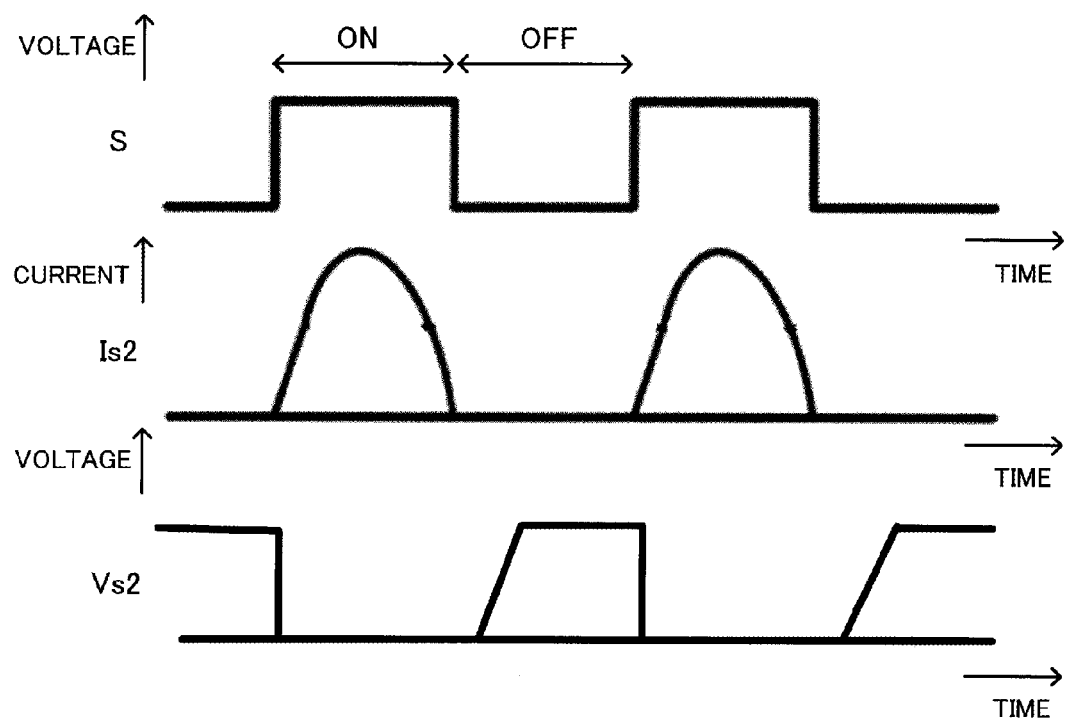
FIG. 4 indicates operational waveforms.

FIGS. 3 and 4 indicate operational waveforms. FIG. 3 indicates waveforms in a PWM converter operated by a square wave. FIG. 4 indicates waveforms in the current resonance converter 3 which is illustrated in FIG. 2 and which is operated by a sine wave.

FIG. 3 indicates the waveforms of a switching frequency S of a switch SWa included in a PWM converter, current Is1 which flows through the switch SWa at the time of the switch SWa being in on and off states, and voltage Vs1 applied to the switch SWa.

FIG. 4 indicates the waveforms of a switching frequency S of the switch SWa included in the current resonance converter 3, current Is2 which flows through the switch SWa at the time of the switch SWa being in on and off states, and voltage Vs2 applied to the switch SWa. In each of FIGS. 3 and 4, a vertical axis indicates voltage or current and a horizontal axis indicates time.

In FIG. 3, when the switch SWa is in an on state, the current Is1 flows through the switch SWa and voltage is not applied to the switch SWa. Furthermore, when the switch SWa is in an off state, current does not flow through the switch SWa and the voltage Vs1 is applied to the switch SWa.

In FIG. 4, when the switch SWa is turned on, the resonance inductor Lr1 is excited by voltage inputted from the direct-current power supply Vi and resonance current which flows through the resonance inductor Lr1, that is to say, the current Is2 which flows through the switch SWa increases from zero like a sine wave.

After the current Is2 peaks, it decreases to zero like a sine wave. In addition, when the current Is2 which flows through the switch SWa becomes zero, the switch SWa is turned off. This switching operation is referred to as zero-current switching.

With a hard switching type PWM converter like that illustrated in FIG. 3, the waveforms of current which flows through a switch and voltage applied to the switch are square waves. As a result, in a time zone in which a rise or a fall takes place at switching time, there is a possibility that current which flows through a switching element overlaps with voltage applied to the switching element. The occurrence of such a phenomenon causes switching loss.

With a soft switching type current resonance converter like that illustrated in FIG. 4, on the other hand, a resonance inductor and a resonance capacitor are located around a switch, current which flows through the switch is made a sine wave by utilizing a resonance phenomenon, and zero-current switching is performed.

This reduces an overlap between voltage and current at switching time and reduces switching loss. Furthermore, with soft switching parasitic elements (parasitic capacitance and parasitic inductance) in a circuit are incorporated in a resonance circuit. Accordingly, a soft switching type current resonance converter also has the advantage of being able to reduce a switching surge (high-frequency oscillation of voltage or current which occurs at switching time) caused by these parasitic elements.

In order to stabilize output voltage, a switching power supply, such as a current resonance converter, accommodates a disturbance, such as fluctuations in input voltage or fluctuations in load, by exercising control so as to increase or decrease a time ratio of a switching pulse.

With the conventional current resonance converter 3, however, the inductance value of the resonance inductor Lr1 and the capacitance value of the resonance capacitor Cr1 are fixed, so a resonance frequency is constant.

Therefore, in order to stabilize output voltage, a time ratio of a switching pulse may be changed for accommodating a disturbance. In that case, however, a switching frequency does not match the resonance frequency. As a result, switching loss occurs and soft switching is not realized.

Furthermore, in such a case, a time ratio of a switching pulse may be increased or decreased by fluctuations in switching frequency in order to make a switching frequency match the resonance frequency. By doing so, control is exercised for stabilizing output voltage.

However, if such control is exercised, a switching frequency changes according to a disturbance. As a result, a loop control band is limited (loop control band is set to about a tenth of a switching frequency or less in order to avert the influence of the switching frequency on a control system).

In addition, the frequency spectrum of noise produced by switching also changes according to a disturbance, so it is difficult to take a noise measure.

On the other hand, in order to reduce the influence of a ripple having a switching frequency or make a response to a disturbance faster, it is effective to adopt a multiphase system in which a plurality of power-supply circuits are arranged in parallel and in which switching frequencies are made to match.

However, if the above control is exercised for changing a switching frequency, a switching frequency of each power-supply circuit is indefinite. As a result, it is difficult to perform parallel operation of the plurality of power-supply circuits (multiphase system is not realized).

Furthermore, the following technique is proposed. A switching frequency is not changed. Control is exercised so as to variably set a resonance frequency of a resonance circuit. By doing so, switching loss is reduced. As stated above, however, if the conventional resonant converter in which a resonance frequency is variably set is adopted, circuit scale increases and circuit structure becomes more complex.

A power supply apparatus according to an embodiment is devised in view of these problems. There is provided a power supply apparatus which has simple circuit structure, which reduces switching loss, and which stabilizes output voltage.

Figure 5:
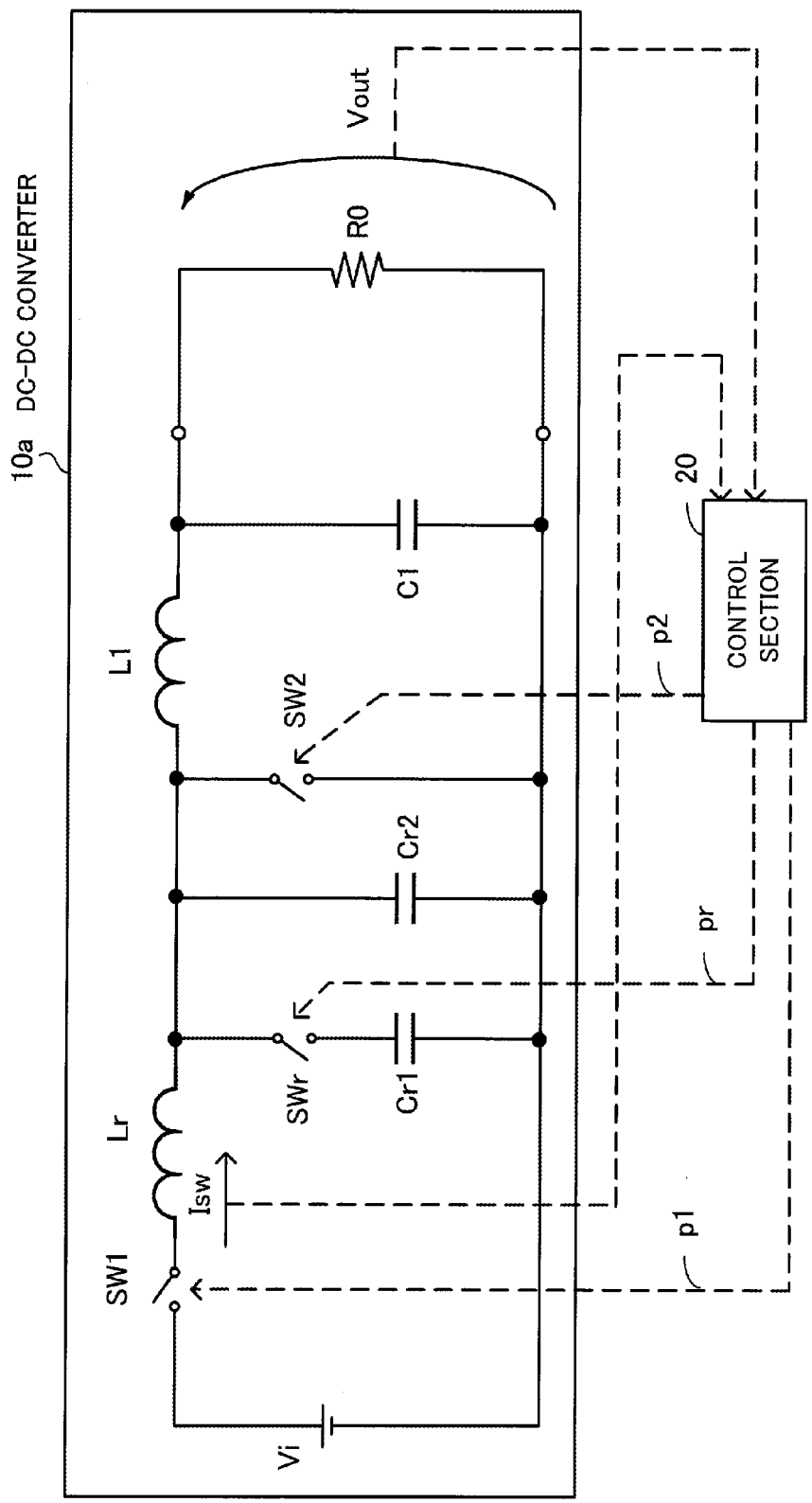
FIG. 5 illustrates an example of the structure of a power supply section.

The power supply apparatus 1 according to an embodiment will now be described in detail. First an example of the circuit structure of the power supply section 10 illustrated in FIG. 1 will be described. FIG. 5 illustrates an example of the structure of the power supply section. A step-down DC-DC converter is taken as an example of the power supply section 10.

A DC-DC converter 10a includes a direct-current power supply Vi, switches SW1, SW2, and SWr, inductors Lr and L1, capacitors Cr1, Cr2, and C1, and a load resistor R0.

Each component is connected in the following way. A (+) terminal of the direct-current power supply Vi is connected to one end of the switch SW1. The other end of the switch SW1 is connected to one end of the inductor Lr. The other end of the inductor Lr is connected to one end of the switch SWr, one end of the capacitor Cr2, one end of the switch SW2, and one end of the inductor L1. The other end of the switch SWr is connected to one end of the capacitor Cr1.

The other end of the inductor L1 is connected to one end of the capacitor C1 and one end of the load resistor R0. A (−) terminal of the direct-current power supply Vi is connected to the other end of the capacitor Cr1, the other end of the capacitor Cr2, the other end of the switch SW2, the other end of the capacitor C1, and the other end of the load resistor R0.

Switch control signals p1, p2, and pr are supplied from the control section 20 to the switches SW1, SW2, and SWr respectively. Switching is performed on the basis of the applied switch control signals p1, p2, and pr. The switches SW1, SW2, and SWr are switching elements and FETs, for example, are used.

The inductor Lr is a resonance inductor and the two capacitors Cr1 and Cr2 are resonance capacitors. Furthermore, the inductor L1 and the capacitor C1 form a filter for smoothing direct-current signal output.

The switch SW1 is a main switch of a switching power supply. When the switch SW1 is in an off state, the switch SW2 is in an on state and current is supplied to the inductor L1 (when the switch SW1 is in an on state, the switch SW2 is in an off state).

A diode may be used as the switch SW2. However, if a diode is used, the probability that loss occurs is high. Therefore, it is desirable to use a transistor switch such as a FET.

The switch SWr is used for increasing or decreasing the capacitance value of the resonance capacitor Cr1 and changing a resonance frequency. A resonance frequency of LC resonance in the DC-DC converter 10a is determined on the basis of the inductance value of the resonance inductor Lr and a combined capacitance value of the resonance capacitors Cr1 and Cr2.

In this case, a combined capacitance value of the resonance capacitors Cr1 and Cr2 is changed by performing on-off switching of the switch SWr on a time-division basis and equivalently increasing or decreasing the capacitance value of the resonance capacitor Cr1.

A capacitance value which is one of the parameters by which a resonance frequency is determined is variably set by controlling timing at which the switch SWr is switched. Accordingly, a resonance frequency (resonance cycle) of current flowing through the switch SW1 can be set to a desired value.

Switching is performed by the switch SWr on the capacitor Cr1, which is one of the capacitors Cr1 and Cr2 connected in parallel. By doing so, a capacitance value on a capacitor Cr1 side is increased or decreased.

This makes it possible to continuously change combined capacitance of the capacitors Cr1 and Cr2 and continuously follow a time ratio of a switching pulse (when a switching frequency changes, a resonance frequency can continuously be made to match the switching frequency).

Furthermore, if the resonance capacitors Cr1 and Cr2 are connected in parallel, the capacitance of the resonance capacitor Cr1 is made smaller than that of the resonance capacitor Cr2. The reason for this is as follows. Switching of input to a capacitor whose capacitance is high is a factor in the occurrence of noise or the like. By connecting the above capacitors Cr1 and Cr2 in parallel, a factor in the occurrence of noise at switching time is removed.

Figure 6:
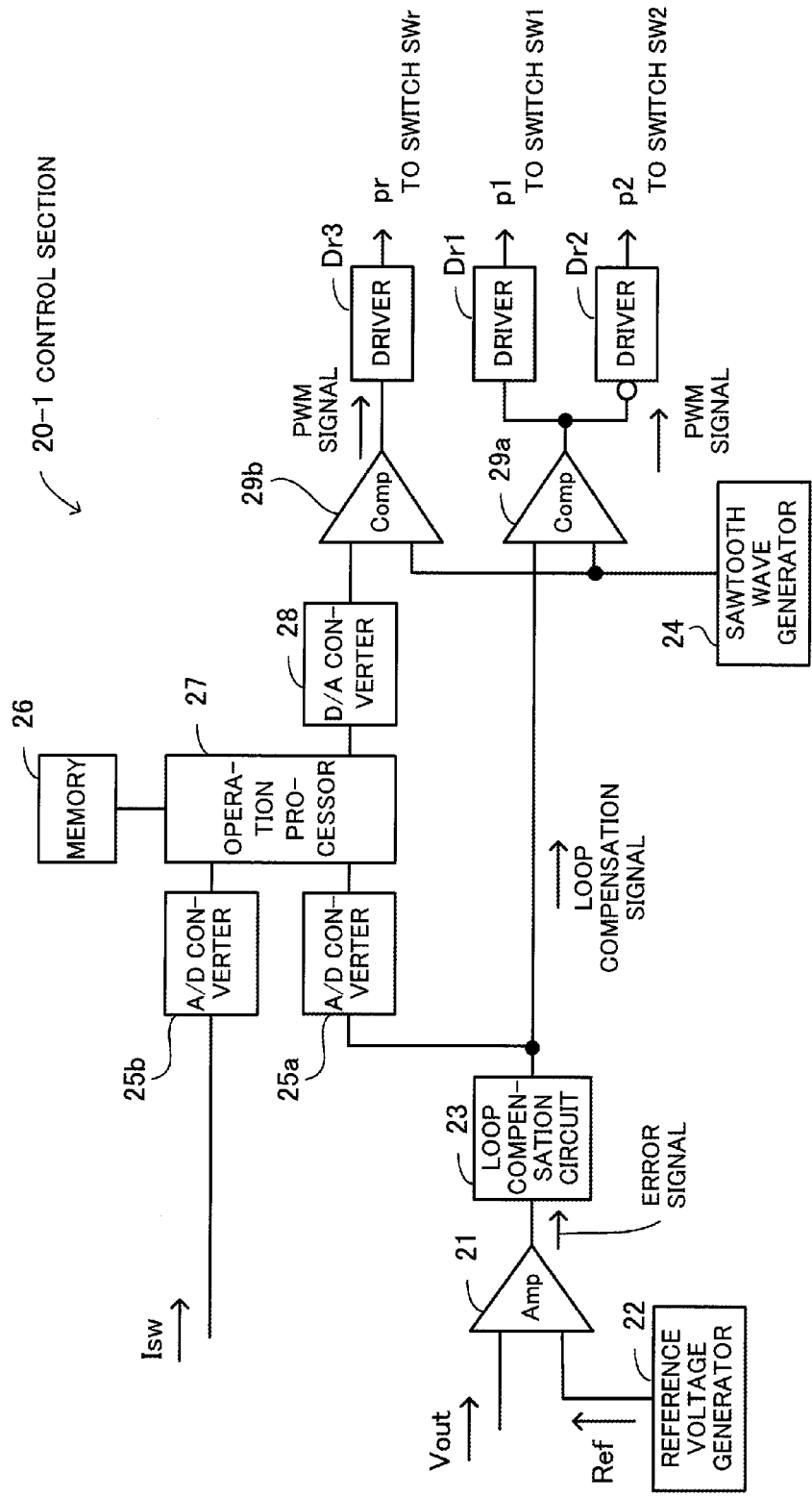
FIG. 6 illustrates an example of the structure of a control section.

An example of the structure of the control section 20 illustrated in FIG. 1 will now be described. FIG. 6 illustrates an example of the structure of the control section. A control section 20-1 is a block which controls the whole of the power supply apparatus 1, and controls switching of each of the switches SW1, SW2, and SWr as one function.

The control section 20-1 includes an amplifier 21, a reference voltage generator 22, a loop compensation circuit 23, a sawtooth wave generator 24, A/D (Analog/Digital) converters 25a and 25b, a memory 26, an operation processor 27, a D/A (Digital/Analog) converter 28, comparators 29a and 29b, and drivers Dr1 through Dr3.

The amplifier 21 detects an error signal which is the differential between output voltage Vout outputted from the DC-DC converter 10a and reference voltage Ref outputted from the reference voltage generator 22, and amplifies and outputs the error signal.

The loop compensation circuit 23 exercises loop compensation control in the power supply apparatus 1 on the basis of an error signal outputted from the amplifier 21. Roughly speaking, output from the DC-DC converter 10a, error detection by the amplifier 21, loop compensation by the loop compensation circuit 23, control of the switches included in the DC-DC converter 10a, and output from the DC-DC converter 10a form a control system loop in the power supply apparatus 1. That is to say, a negative feedback loop for keeping output voltage Vout constant is formed.

In this case, when a signal makes a round of the loop and its phase is inverted, negative feedback is realized. For example, however, if the phase of a signal which has made a round of the loop is the same as that of an original signal (in-phase) and the gain is 1 (0 dB), oscillation conditions are met and oscillation takes place.

Therefore, on the basis of an error signal inputted, the loop compensation circuit 23 generates a loop compensation signal (voltage signal) for controlling the switches SW1 and SW2 so as to make the power supply apparatus 1 deviate from the oscillation conditions as far as possible.

The sawtooth wave generator 24 generates a sawtooth wave with determined width in a determined cycle. The comparator 29a compares a loop compensation signal and a sawtooth wave and generates a PWM signal with determined pulse width.

On the basis of a PWM signal, the driver Dr1 outputs a switch control signal p1 for controlling switching of the switch SW1. Furthermore, on the basis of a PWM signal, the driver Dr2 outputs a switch control signal p2 for controlling switching of the switch SW2.

In this case, the driver Dr2 outputs a switch control signal p2 whose phase is inverted so that the on and off states of the switch SW2 will correspond to the off and on states, respectively, of the switch SW1.

On the other hand, the A/D converter 25a converts an analog loop compensation signal to a digital signal. The memory 26 stores the correspondence between a time ratio of a switching pulse of the switch SW1 or SW2 and a resonance frequency which matches an edge of a switching pulse having each time ratio.

The operation processor 27 is a CPU (Central Processing Unit), a digital operation circuit, or the like. When the operation processor 27 receives a digital value of a loop compensation signal, the operation processor 27 recognizes an output voltage value of the driver Dr3 and generates a driving signal, on the basis of contents registered in the memory 26.

The D/A converter 28 converts a digital driving signal to an analog driving signal. The comparator 29b compares an analog driving signal and a sawtooth wave and generates a PWM signal with determined pulse width. On the basis of a PWM signal, the driver Dr3 outputs a switch control signal pr for controlling switching of the switch SWr.

On the other hand, the A/D converter 25b converts current Isw flowing through the switch SW1 (current Isw flows at a falling edge of a switching pulse of the switch SW1) to a digital signal. The operation processor 27 generates data to be registered in the memory 26 in training mode described later on the basis of a digital value of current Isw flowing through the switch SW1.

Figure 7:
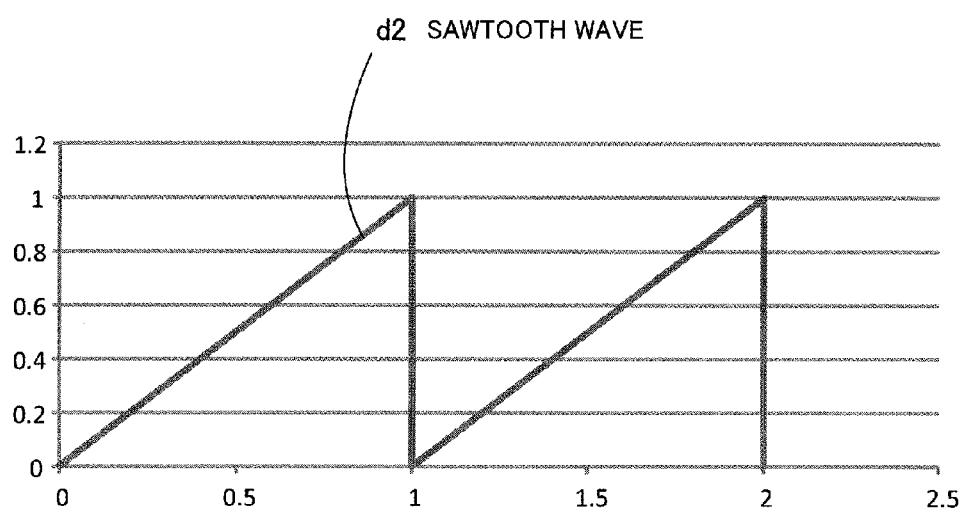
FIG. 7 indicates the output waveform of a sawtooth wave generator.

PWM signal generation operation will now be described. FIG. 7 indicates the output waveform of the sawtooth wave generator. In FIG. 7, a vertical axis indicates voltage and a horizontal axis indicates time. A sawtooth wave d2 having a shape illustrated in FIG. 7 is outputted from the sawtooth wave generator 24. For the sake of simplicity the minimum voltage and maximum voltage of the sawtooth wave d2 are 0 and 1 V respectively.

Figure 8:
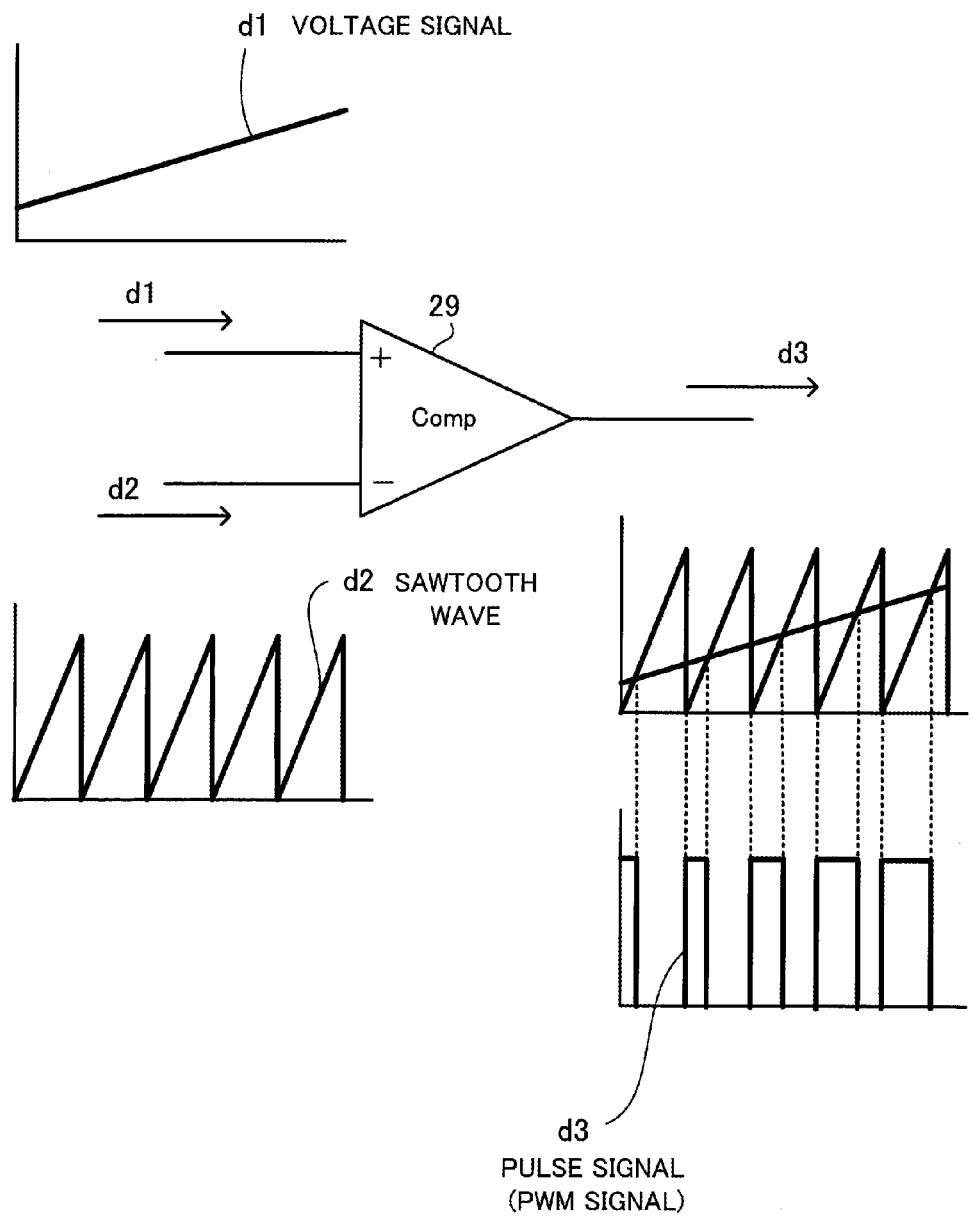
FIG. 8 is a view for describing PWM signal generation operation.

FIG. 8 is a view for describing PWM signal generation operation. On each graph in FIG. 8, a vertical axis indicates voltage and a horizontal axis indicates time. PWM (Pulse Width Modulation) is a process for converting the magnitude of a signal wave to the magnitude of pulse width, and is realized by, for example, a circuit illustrated in FIG. 8.

A voltage signal d1 (loop compensation signal outputted from the loop compensation circuit 23, for example) is inputted to a (+) terminal of a comparator 29 and the sawtooth wave d2 (signal generated by the sawtooth wave generator 24) is inputted to a (−) terminal of the comparator 29.

When voltage inputted to the (+) terminal is higher than voltage inputted to the (−) terminal, the comparator 29 outputs a H level. Accordingly, when the level of the voltage signal d1 is higher than that of the sawtooth wave d2 in this case, output from the comparator 29 is at a H level and a pulse signal d3 (PWM signal) is outputted from the comparator 29.

When the voltage signal d1 is at a low level, the pulse width of the pulse signal d3 is small. When the voltage signal d1 is at a high level, the pulse width of the pulse signal d3 is large. This means that pulse width modulation is performed.

A table stored in the memory 26 will now be described. FIG. 9 indicates an example the structure of a table stored in the memory. A table T1 includes Loop Compensation Signal Value and Driver Output Value items.

A loop compensation signal value is obtained by digitizing output from the loop compensation circuit 23, and corresponds to a duty of a driving waveform of the switch SW1 or SW2. Furthermore, a driver output value is a digital value corresponding to an output voltage value of the driver Dr3, and corresponds to a duty of a driving waveform of the resonance switch SWr (each value indicated in FIG. 9 is an example and operation is not verified).

When the operation processor 27 receives a digital voltage value of a loop compensation signal, the operation processor 27 refers to values registered in the table T1 held in the memory 26, and acquires an output voltage value of the driver Dr3. This means that a duty of a driving waveform of the resonance switch SWr corresponding to a duty of a driving waveform of the switch SW1 or SW2 is acquired.

Figure 10:
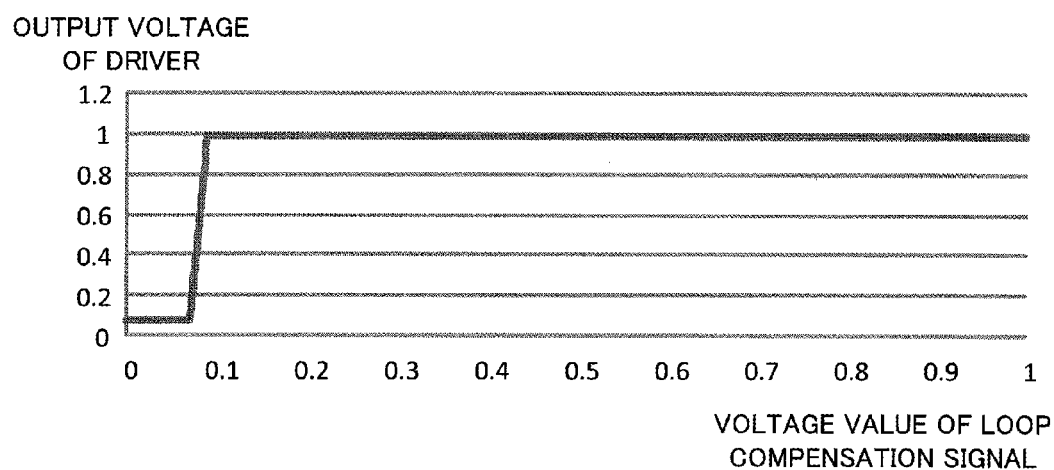
FIG. 10 indicates an output voltage waveform.

FIG. 10 indicates an output voltage waveform based on the table T1. FIG. 10 indicates the output voltage waveform of the driver Dr3. In FIG. 10, a vertical axis indicates output voltage of the driver Dr3 and a horizontal axis indicates a voltage value of a loop compensation signal.

As has been described, the control section 20 registers in a table a time ratio of a driving waveform of the switch SW1 (and the switch SW2) as information regarding a time ratio of a switching pulse and a time ratio of a driving waveform of the resonance switch SWr as information regarding a resonance frequency and holds the table in the memory 26.

As a result, a resonance frequency (duty of a driving waveform of the switch SWr) corresponding to a switching frequency of the switch SW1 or SW2 is easily acquired from the memory 26 in an instant during system operation. This makes it possible to control a switching power supply without using a complex circuit.

The operation of measuring in the training mode the relationship between switching timing of a switching power supply and a resonance frequency will now be described. The control section 20 operates in the training mode in which it performs switching of the resonance switch SWr, regulates a resonance frequency, and acquires data.

Figure 11:
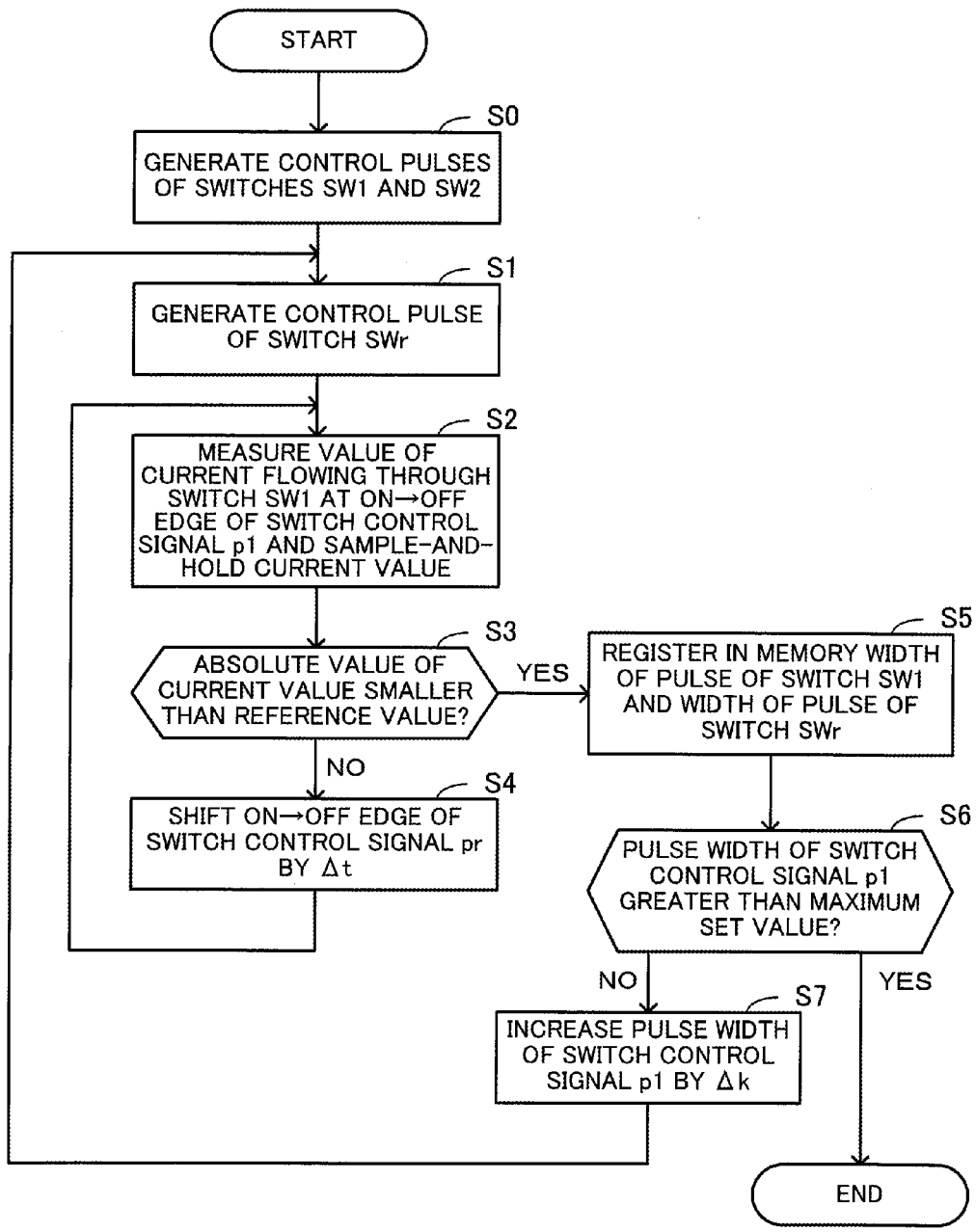
FIG. 11 is a flow chart of the operation of the control section at the time of being in training mode.
Figure 12:
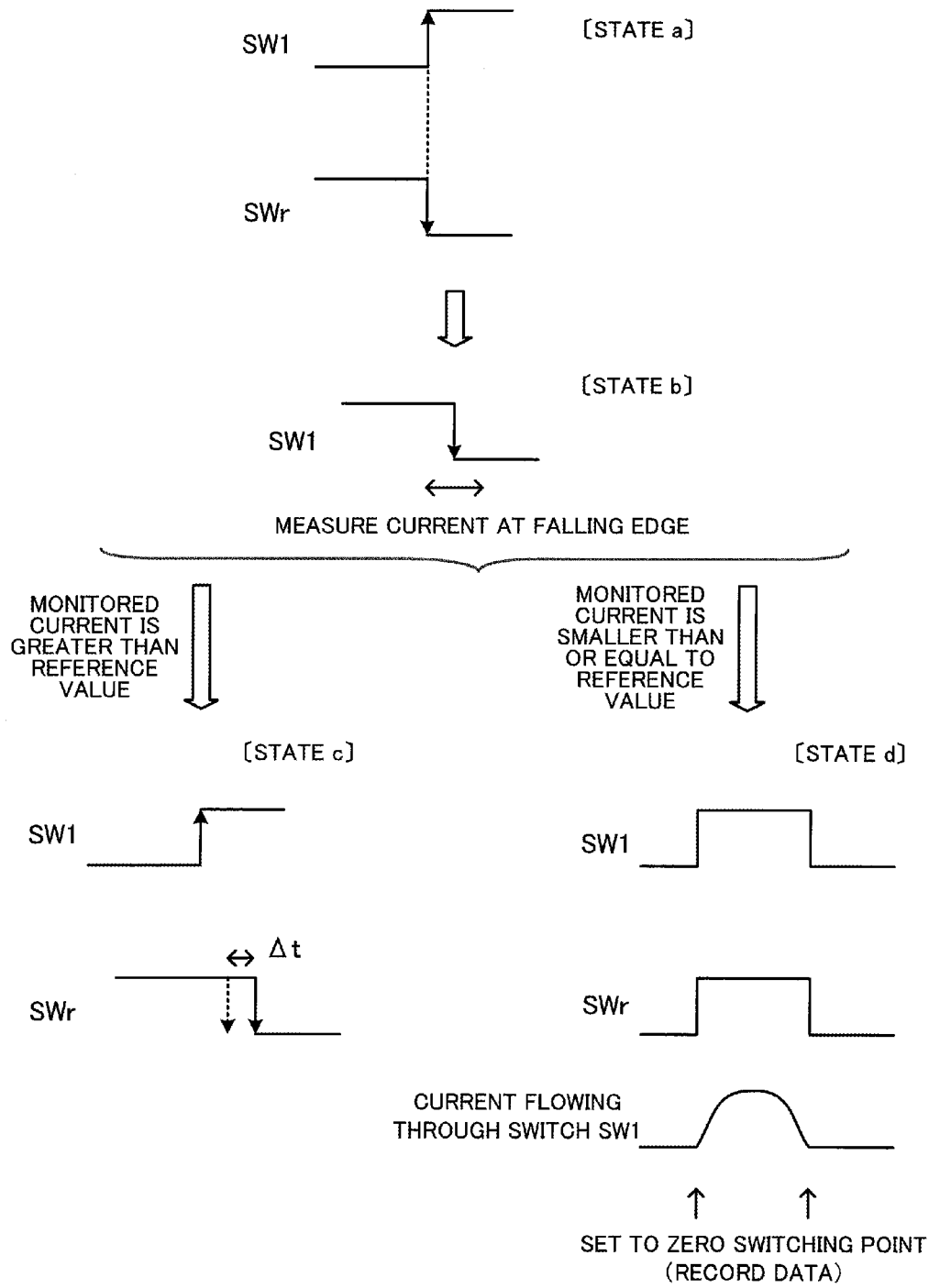
FIG. 12 is a view for describing the operation of the control section at the time of being in the training mode.

FIG. 11 is a flow chart of the operation of the control section at the time of being in the training mode. Furthermore, FIG. 12 is a view for describing the operation of the control section at the time of being in the training mode. In FIG. 12, the flow indicated in FIG. 11 is intelligibly described by the use of waveforms.

(Step S0) The control section 20 outputs a switch control signal p1 to the switch SW1 and outputs a switch control signal p2 to the switch SW2. At this time the pulse width of the switch control signal p1 (or the switch control signal p2) is made narrowest in a used range.

(Step S1, State a) The control section 20 outputs a switch control signal pr to the switch SWr. At this time (at the beginning of training) the control section 20 controls the switch SWr so as to make a falling edge (on→off edge) of the switch control signal pr equal to a rising edge (off→on edge) of the switch control signal p1 in timing.

(Step S2, State b) The control section 20 monitors a value of current flowing through the switch SW1 at a falling edge (on→off edge) of the switch control signal p1 and sample-and-holds the current value.

(Step S3) The control section 20 determines whether or not the absolute value of the current value which it sample-and-holds is smaller than a reference value set in advance. If the absolute value of the current value is smaller than or equal to the reference value, then the control section 20 proceeds to step S5. If the absolute value of the current value is greater than the reference value, then the control section 20 proceeds to step S4.

(Step S4, State c) The control section 20 shifts the falling edge (on-off edge) of the switch control signal pr by time Δt. The control section 20 then returns to step S2.

(Step S5, State d) The control section 20 registers in the memory 26 the width of a pulse of the switch SW1 and the width of a pulse of the switch SWr found from the position of the falling edge (on→off edge) of the switch control signal pr.

The width of a pulse of the switch SW1 is a duty of a switching pulse of the switch SW1 and the width of a pulse of the switch SWr is a duty of a switching pulse of the switch SWr.

(Step S6) The control section 20 determines whether or not the pulse width of the switch control signal p1 is greater than a maximum set value. If the pulse width of the switch control signal p1 is greater than the maximum set value, then the control section 20 ends the operation. If the pulse width of the switch control signal p1 is not greater than the maximum set value, then the control section 20 proceeds to step S7.

(Step S7) The control section 20 increases the pulse width of the switch control signal p1 by time Δk. The control section 20 then returns to step S1.

In steps S6 and S7, the control section 20 increases the width of a switching pulse of the switch SW1 little by little to the maximum set value and finds a duty of a switching pulse of the switch SWr by which a resonance frequency corresponding to a duty of a switching pulse after an increase is realized. The control section 20 measures and acquires in advance plural data values corresponding to a disturbance, such as fluctuations in load, in this way.

In the above training sequence, the control section 20 monitors current flowing through the switch SW1 at a current resonance frequency in a time zone in which there is a falling edge of a switching pulse of the switch SW1.

If a monitored value is smaller than or equal to the reference value, then the control section 20 determines that zero-current switching is realized at the current resonance frequency, and holds information regarding the current resonance frequency. If a monitored value is greater than the reference value, then the control section 20 determines that zero-current switching is not realized at the current resonance frequency, performs switching for shifting a falling edge of a switching pulse of the switch SWr by determined width, and changes the current resonance frequency.

The above training sequence makes it possible to continuously changes the resonance cycle of a current waveform of the switch SW1 and acquire data (duty of a driving waveform of the switch SWr) by which a zero switching point is accurately set according to various disturbances such as fluctuations in load.

After the power supply apparatus 1 shifts to steady-state operation mode, the control section 20 observes the difference between output voltage and reference voltage, an internal state, and the like and finds a time ratio of a switching pulse of the switch SW1 by performing an operation and using an analog filter. This is the same with a conventional power supply.

After the control section 20 determines a time ratio of a switching pulse of the switch SW1, the control section 20 reads out from the memory 26 a duty (switch-on time) of a switching pulse of the switch SWr by which a resonance frequency corresponding to the time ratio can be realized, and controls the switch SWr.

In this case, it is assumed that the capacitance values of the resonance capacitors Cr1 and Cr2 are Ca and Cb respectively. When the switch SW1 changes from an off state to an on state, the control section 20 turns on the switch SWr and makes a capacitance value of the resonance capacitors Cr1 and Cr2 (Ca+Cb).

The control section 20 then turns off the switch SWr in a period for which the switch SW1 is in an on state. From this moment onward only the capacitance value Cb of the capacitor Cr2 is used as a capacitance value of a resonance capacitor.

By setting a capacitance value of a resonance capacitor in this way on a time-division basis, a resonance frequency is continuously changed. In addition, a deviation between an edge of a switching signal and an edge of resonance current in soft switching is efficiently reduced.

Simulation results of a shift in waveform in switch control will now be described. Each of FIGS. 13 through 17 indicates a shift in waveform at switch switching time. In FIGS. 13 through 17, a vertical axis of each of graphs g1 and g3 indicates voltage, a vertical axis of a graph g2 indicates current, a vertical axis of a graph g4 indicates power density, and a horizontal axis of each of the graphs g1 through g4 indicates time.

Figure 13:
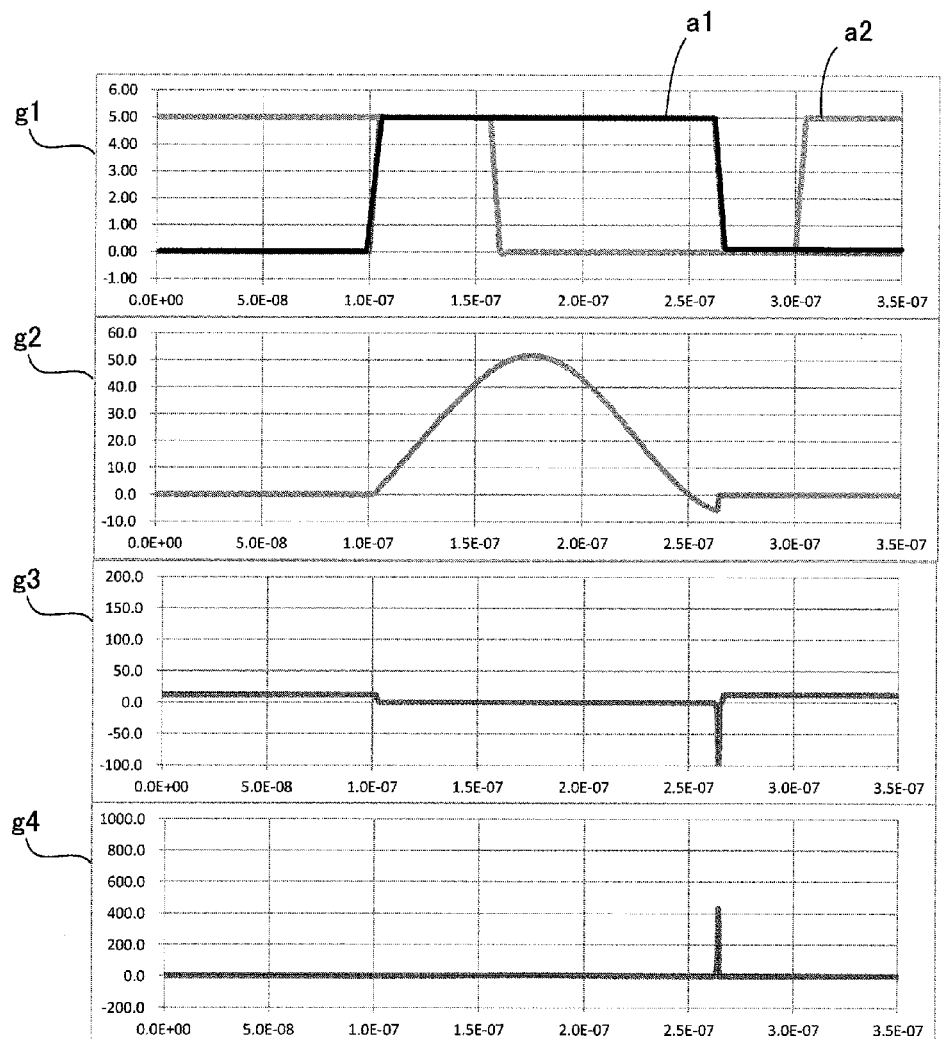
FIG. 13 indicates a shift in waveform at switch switching time.
Figure 14:
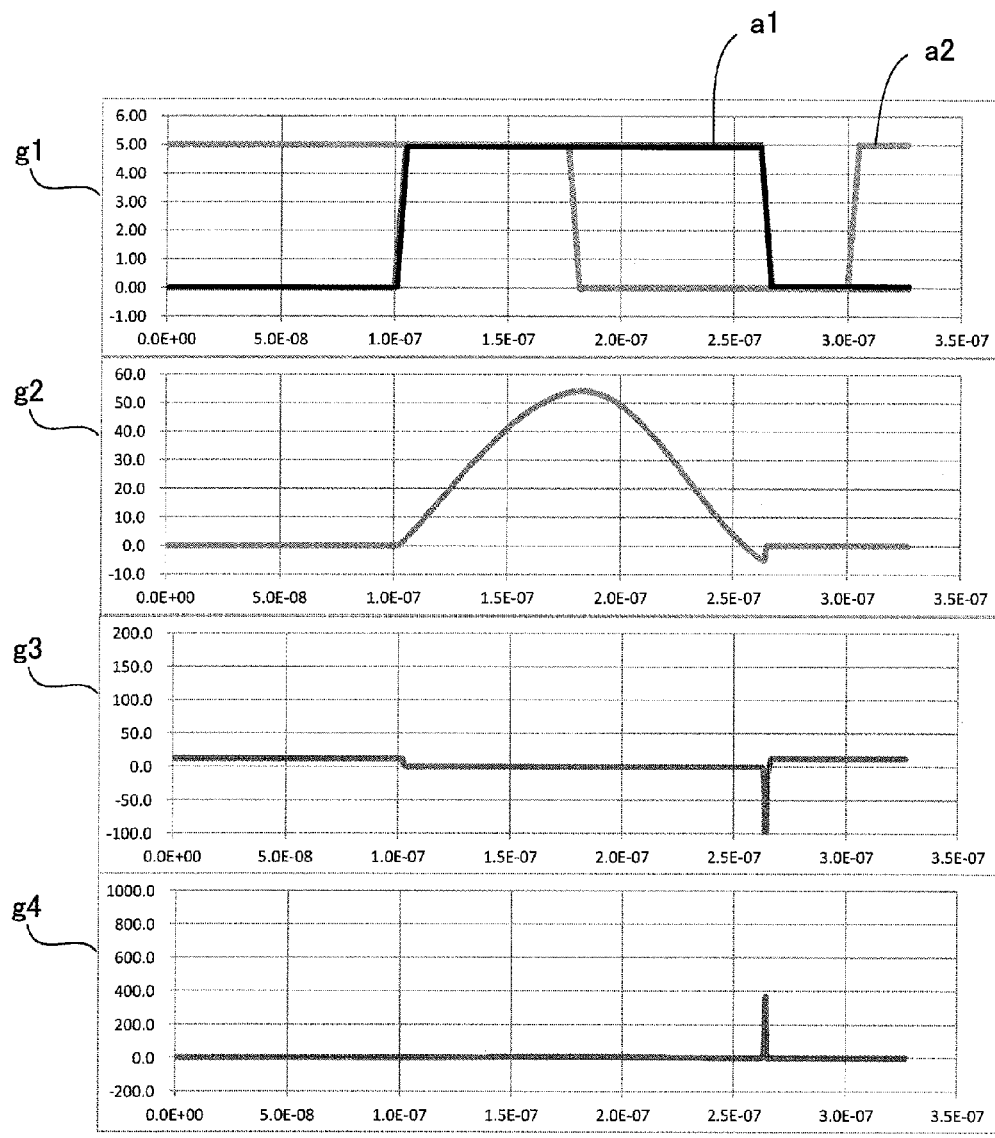
FIG. 14 indicates a shift in waveform at switch switching time.
Figure 15:
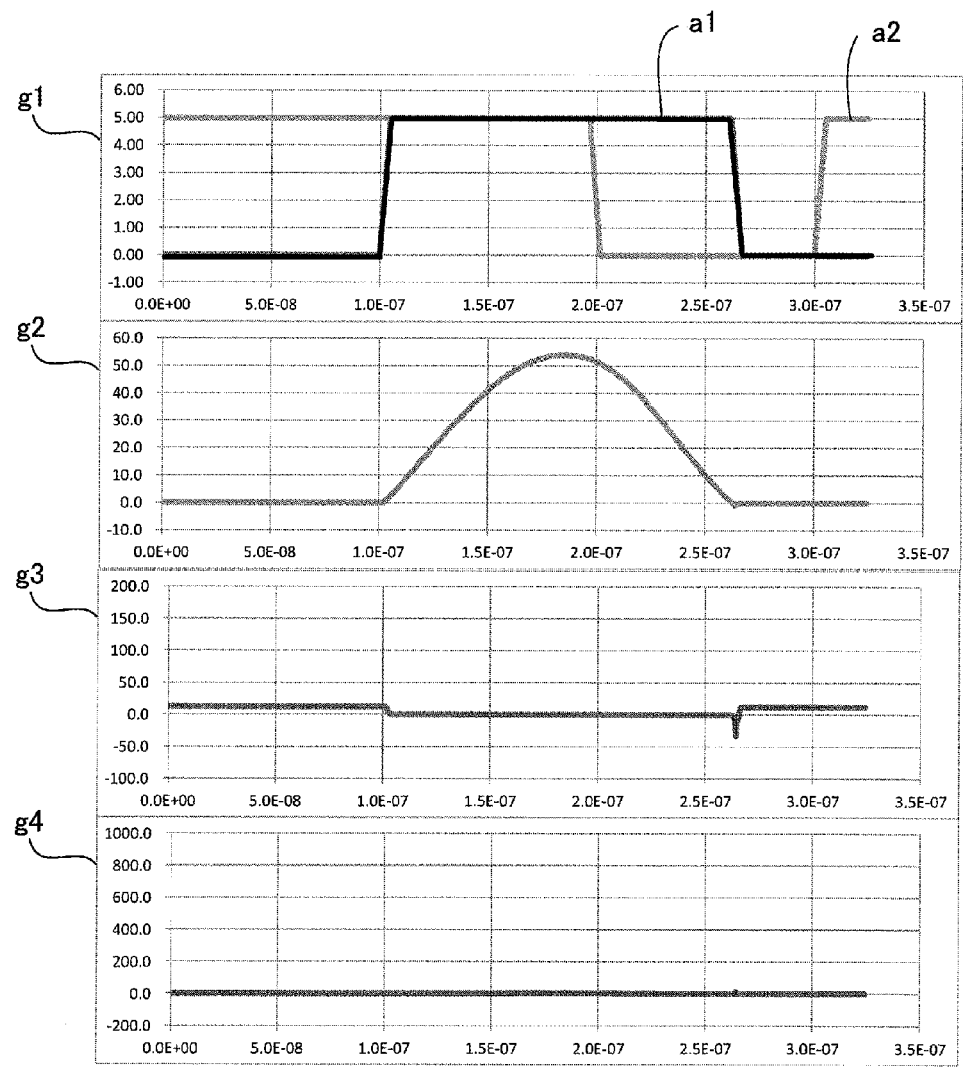
FIG. 15 indicates a shift in waveform at switch switching time.
Figure 16:
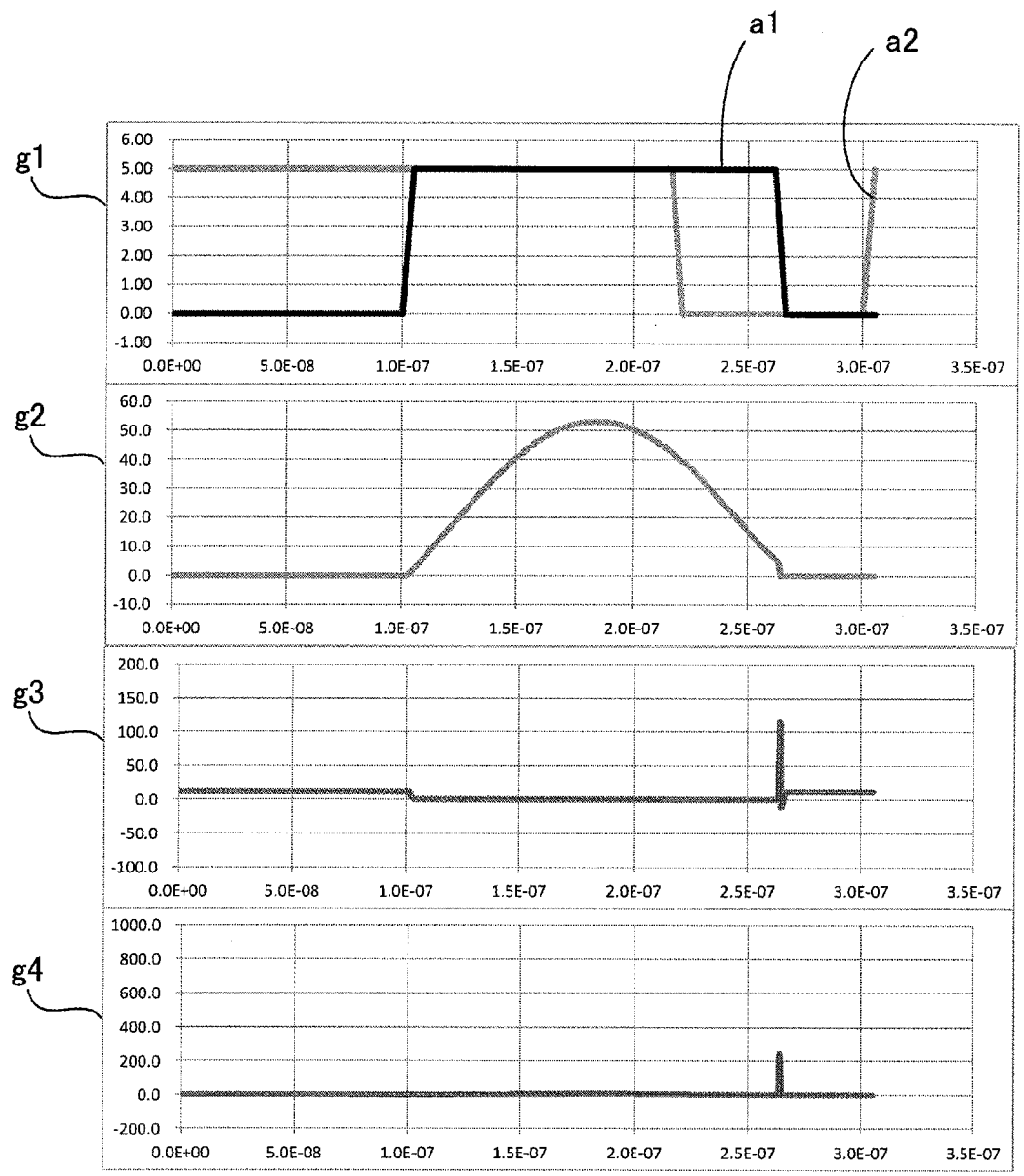
FIG. 16 indicates a shift in waveform at switch switching time.
Figure 17:
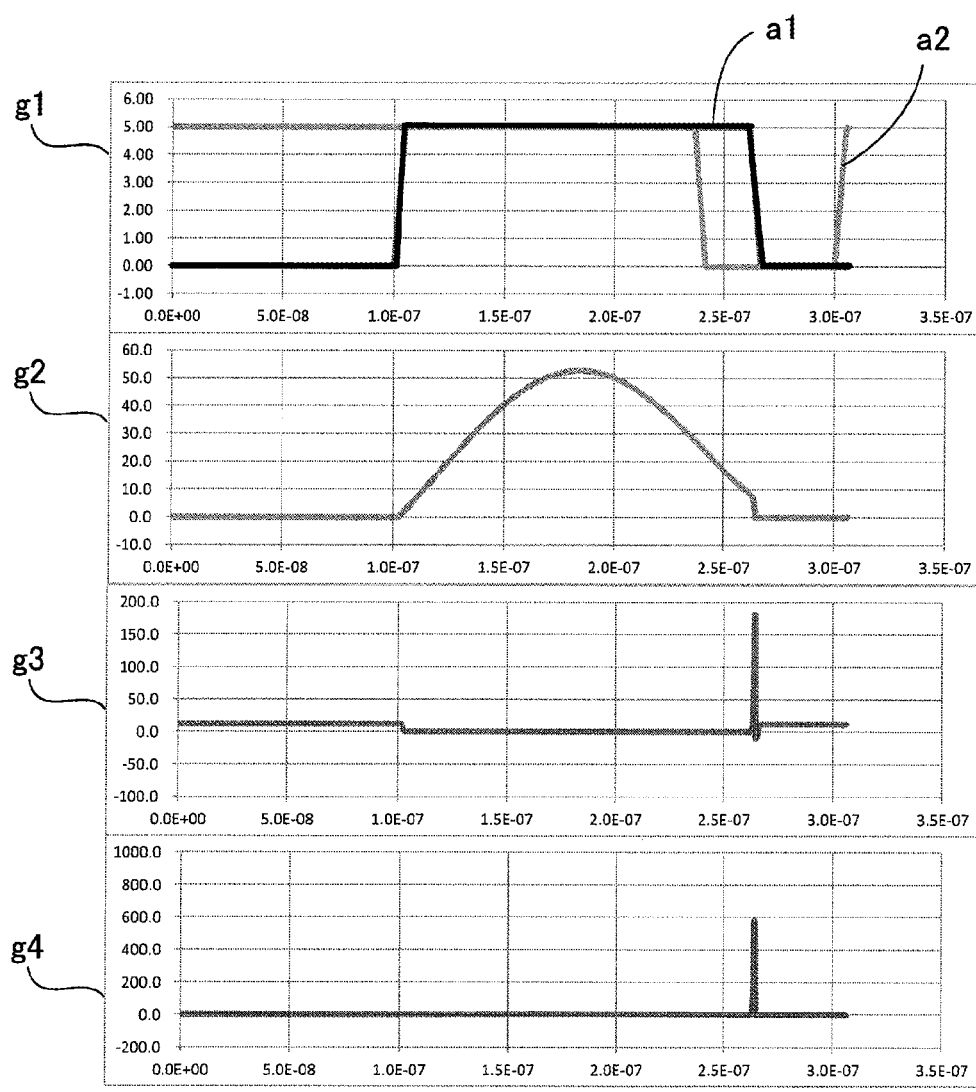
FIG. 17 indicates a shift in waveform at switch switching time.

It is assumed that the timing of switching of the switch SWr indicated in FIG. 13 is considered as a start. FIG. 14 indicates a state in which the timing of switching of the switch SWr is delayed for 20 ns from the timing indicated in FIG. 13. FIG. 15 indicates a state in which the timing of switching of the switch SWr is delayed for 40 ns from the timing indicated in FIG. 13. FIG. 16 indicates a state in which the timing of switching of the switch SWr is delayed for 80 ns from the timing indicated in FIG. 13. FIG. 17 indicates a state in which the timing of switching of the switch SWr is delayed for 100 ns from the timing indicated in FIG. 13.

Furthermore, a signal a1 on the graph g1 corresponds to a switch control signal p1 used for controlling switching of the switch SW1, and a signal a2 on the graph g1 corresponds to a switch control signal pr used for controlling switching of the switch SWr (when each signal is at a H level, each switch is in an on state).

The graph g2 indicates current flowing through the switch SW1. The graph g3 indicates voltage across the switch SW1. The graph g4 indicates switching loss which occurs in the switch SW1.

At the timing of the switching of the switch SWr indicated in FIG. 15 of FIGS. 13 through 17, a resonance cycle matches time at which the switch SW1 turns on. As a result, the amount of switching loss which occurs in the switch SW1 is smallest (approximately zero).

As can be seen from FIGS. 13 through 17, as the timing of the switching of the switch SWr shifts, the cycle of current resonance changes. In addition, if the cycle of current resonance matches time at which the switch SW1 turns on (FIG. 15), loss which occurs at the time of switching of the switch SW1 is smallest.

With the waveforms indicated in FIGS. 13 through 17, ideal element models are used for making circuit operation simple. In a real circuit, however, parasitic inductance or parasitic capacitance of a switching element or a board causes an overshoot or a ringing in a waveform.

Figure 18:
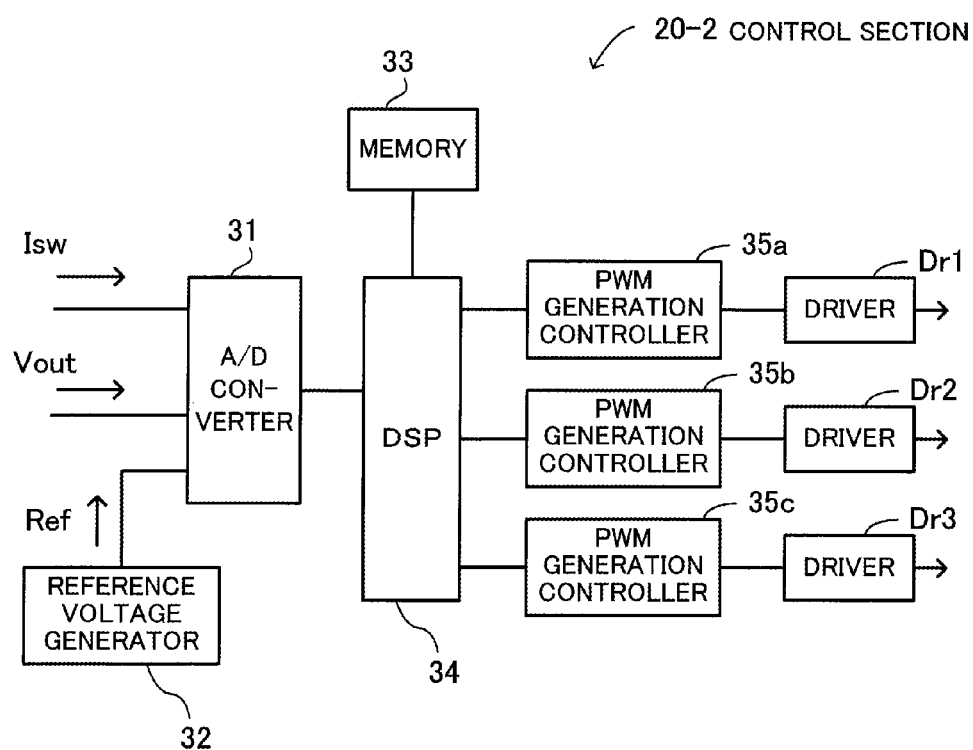
FIG. 18 illustrates an example of the structure of the control section.

A modification of the control section 20 will now be described. FIG. 18 illustrates an example of the structure of the control section. A control section 20-2 includes an A/D converter 31, a reference voltage generator 32, a memory 33, a DSP (Digital Signal Processor) 34, PWM generation controllers 35a through 35c, and drivers Dr1 through Dr3.

The A/D converter 31 converts analog direct-current voltage Vout generated by the DC-DC converter 10a, current Isw flowing through the switch SW1, and analog reference voltage Ref outputted from the reference voltage generator 32 to digital signals.

The memory 33 holds the table T1 indicated in FIG. 9.

The DSP 34 performs digital operations for performing processes including error detection by comparing voltage outputted from the power supply apparatus and the reference voltage, loop compensation control, and generation of a pulse of the switch SWr for generating a resonance cycle most suitable for a duty corresponding to a loop compensation signal.

Each of the PWM generation controllers 35a through 35c generates a PWM signal on the basis of a signal outputted from the DSP 34. The drivers Dr1 through Dr3 exercise drive control which is the same as that described in FIG. 6 to drive the switches SW1, SW2, and SWr respectively.

As has been described in the foregoing, with the power supply apparatus 1 according to the embodiment a PWM waveform (switching pulse of the switch SW1) for soft switching is monitored and a capacitor switching pulse (driving pulse of the switch SWr) by which the timing of an edge of the PWM waveform matches the timing of an edge of a current resonance waveform is generated in the control section 20.

In this case, the control section 20 also finds in advance the correspondence between a time ratio of a switching pulse and a resonance frequency which matches an edge of a switching pulse having each time ratio. The control section 20 sets a resonance frequency corresponding to a time ratio of a switching pulse at operation time from among resonance frequencies found in advance.

This reduces circuit scale in a control system and output voltage is stabilized by simple circuit structure. Furthermore, timing control for soft switching and timing control of a resonance frequency can be exercised independently of each other, so a power supply is controlled more flexibly.

In addition, with the POL in which there are a plurality of switching power supplies, for example, the timing of resonance capacitor switching is controlled individually for plural switching frequencies of the plurality of switching power supplies. As a result, a plurality of resonant converters are easily controlled in block by one control system.

The embodiment has been described. However, a component included in each section indicated in the embodiment may be replaced with another component having the same function. In addition, any other component or process may be added.

According to the disclosed power supply apparatus, output voltage is stabilized by simple circuit structure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A power supply apparatus comprising:
   a power supply section including:
      a first switch which performs switching of power-supply output;
      an inductor and a capacitor which form an LC circuit that resonates current flowing through the first switch; and
      a second switch which changes capacitance of the capacitor; and
      a control section which performs switching of the second switch to regulate resonance frequencies in a training mode, acquires a correspondence in the training mode, the correspondence being between a first time ratio of a switching pulse of the first switch, the first time ratio being a ratio of a first switch-on time to a first switch-off time, and a resonance frequency that matches an edge of the switching pulse, recognizes an operating resonance frequency corresponding to the first time ratio of a switching pulse at an operation time from among the resonance frequencies regulated in the training mode, and controls switching of the second switch so as to resonate the LC circuit at the operating resonance frequency at the operation time;

wherein:

in the training mode the control section monitors the current flowing through the first switch at a current resonance frequency in a time zone in which there is a falling edge of a switching pulse of the first switch;

when a monitored value is smaller than or equal to a reference value, the control section determines that zero-current switching is realized at the current resonance frequency, and holds information regarding the current resonance frequency; and when the monitored value is greater than the reference value, the control section determines that the zero-current switching is not realized at the current resonance frequency, and changes the current resonance frequency by performing the switching of the second switch for shifting a falling edge of a switching pulse of the second switch by a determined width.

2. The power supply apparatus according to claim 1, wherein the control section registers in a table the first time ratio of a driving waveform of the first switch and a second time ratio of a driving waveform of the second switch, the second time ratio being a ratio of a second switch-on time to a second switch-off time, and holds the table in a memory.

3. The power supply apparatus according to claim 1, wherein:

the LC circuit includes a first capacitor and a second capacitor;

capacitance of the second capacitor is fixed;

capacitance of the first capacitor is increased or decreased by the second switch; and the capacitance of the first capacitor is lower than the capacitance of the second capacitor.

4. The power supply apparatus according to claim 3, wherein:

when the first switch changes from an off state to an on state, the control section turns on the second switch and uses combined capacitance of the first capacitor and the second capacitor as a capacitance value of a resonance capacitor of the LC circuit;

while the first switch is in the on state, the control section turns off the second switch and uses the capacitance of the first capacitor as the capacitance value of the resonance capacitor of the LC circuit; and the control section performs switching of the capacitance value of the resonance capacitor on a time-division basis.

* * * * *